(12) United States Patent
Rubens et al.

(10) Patent No.: US 10,040,215 B2
(45) Date of Patent: Aug. 7, 2018

(54) BLADE AND BLADE ATTACHMENT SYSTEM FOR AN OSCILLATING TOOL

(71) Applicants: Robert Bosch Tool Corporation, Broadview, IL (US); Robert Bosch GmbH, Stuttgart (DE)

(72) Inventors: Jeremy Rubens, Palatine, IL (US); Jaime Moreno, Imperial, CA (US); Fernando Porchas, Mexicali (MX)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 165 days.

(21) Appl. No.: 14/935,952

(22) Filed: Nov. 9, 2015

(65) Prior Publication Data

US 2017/0129126 A1    May 11, 2017

(51) Int. Cl.
| | | |
|---|---|---|
| *B27B 19/00* | (2006.01) | |
| *B26B 7/00* | (2006.01) | |
| *B25F 5/02* | (2006.01) | |

(52) U.S. Cl.
CPC .............. *B27B 19/006* (2013.01); *B25F 5/02* (2013.01); *B26B 7/00* (2013.01)

(58) Field of Classification Search
CPC ..... B27B 19/00; B27B 19/002; B27B 19/004; B27B 19/006; B27B 19/008; B27B 7/00; B27B 7/005
USPC .................................................. 30/392–394
See application file for complete search history.

(56) References Cited

U.S. PATENT DOCUMENTS

| | | | | | |
|---|---|---|---|---|---|
| 3,440,915 | A | * | 4/1969 | Weyant | B23D 35/00 83/481 |
| 3,943,934 | A | * | 3/1976 | Bent | B27B 5/32 30/339 |
| 4,386,609 | A | * | 6/1983 | Mongeon | B23D 51/10 30/339 |
| 5,038,478 | A | * | 8/1991 | Mezger | B26B 7/00 30/169 |
| 5,263,283 | A | * | 11/1993 | Rudolf | B25F 3/00 451/342 |
| 5,366,312 | A | * | 11/1994 | Raines | B24B 45/00 30/340 |
| 5,423,825 | A | * | 6/1995 | Levine | A61B 17/1604 29/275 |
| 5,456,011 | A | * | 10/1995 | Inkster | B23D 61/006 30/293 |
| 5,658,304 | A | * | 8/1997 | Lim | A61B 17/1637 30/351 |
| 5,735,866 | A | * | 4/1998 | Adams | B23D 61/006 30/339 |
| 7,189,239 | B2 | * | 3/2007 | Fisher | B23D 51/10 606/176 |
| 7,217,177 | B2 | * | 5/2007 | Frech | B24B 23/04 451/357 |

(Continued)

*Primary Examiner* — Jason Daniel Prone
*Assistant Examiner* — Richard Crosby, Jr.
(74) *Attorney, Agent, or Firm* — Maginot Moore & Beck LLP (57) ABSTRACT

A blade attachment system includes a tool mount adapter for attaching the blade attachment system to a toolholder of an oscillating tool, a blade holder plate for supporting a blade, a clamping assembly for clamping the blade to the blade holder plate in a clamped position, and a locking mechanism for locking the blade in the clamped position.

17 Claims, 8 Drawing Sheets

(56) References Cited

U.S. PATENT DOCUMENTS

| | | | | |
|---|---|---|---|---|
| 7,833,241 B2* | 11/2010 | Gant | .................. | A61B 17/1637 30/339 |
| 8,151,679 B2* | 4/2012 | Bohne | .................... | B24B 23/04 83/698.11 |
| 8,365,419 B2* | 2/2013 | Bernardi | .................. | B25F 5/00 30/371 |
| 8,925,931 B2* | 1/2015 | Sergyeyenko | .......... | B24B 23/04 279/141 |
| 9,174,354 B2* | 11/2015 | Zhou | ........................ | B27B 5/32 |
| 9,486,934 B2* | 11/2016 | Zhou | ........................ | B23Q 3/14 |
| 9,539,682 B2* | 1/2017 | Kawakami | ............... | B23Q 3/14 |
| 9,669,536 B2* | 6/2017 | Ito | ............................. | B25F 5/02 |
| 9,694,472 B2* | 7/2017 | Luescher | ............. | B24B 45/006 |
| 9,751,203 B2* | 9/2017 | Wierzchon | ............... | B25F 3/00 |
| 2010/0056029 A1* | 3/2010 | Grunikiewicz | ....... | B23B 31/008 451/442 |
| 2011/0000690 A1* | 1/2011 | Kildevaeld | ........... | B23D 51/10 173/29 |
| 2011/0067894 A1* | 3/2011 | Bernardi | .................. | B25F 5/00 173/1 |
| 2011/0266759 A1* | 11/2011 | Goldman | ................ | B24B 23/04 279/106 |
| 2011/0316241 A1* | 12/2011 | Zhang | .................. | B23D 61/006 279/143 |
| 2012/0169018 A1* | 7/2012 | Lu | ............................. | B25F 3/00 279/143 |
| 2013/0180747 A1* | 7/2013 | Brown | ...................... | B25F 5/00 173/145 |
| 2013/0193655 A1* | 8/2013 | Kaye, Jr. | ............... | B27B 19/006 279/141 |
| 2014/0182873 A1* | 7/2014 | Fankhauser | ............. | B24B 45/00 173/213 |
| 2014/0299345 A1* | 10/2014 | McRoberts | ........... | B24B 23/043 173/162.2 |
| 2016/0271711 A1* | 9/2016 | Qian | ...................... | B27B 19/006 |
| 2017/0050292 A1* | 2/2017 | Aoki | ....................... | B23D 51/10 |
| 2017/0129126 A1* | 5/2017 | Rubens | ................ | B27B 19/006 |

* cited by examiner

BLADE AND BLADE ATTACHMENT SYSTEM FOR AN OSCILLATING TOOL

TECHNICAL FIELD

The disclosure relates generally to oscillating power tools, and more particularly to blades and blade attachment systems for oscillating power tools.

BACKGROUND

In general, oscillating tools are light-weight, handheld power tools capable of being equipped with a variety of tool accessories and attachments, such as cutting blades, sanding discs, grinding tools, and many others. These types of tools, referred to hereinafter as power tools, typically include a generally cylindrically-shaped main body that serves as an enclosure for an electric motor as well as a hand grip for the tool. The electric motor is operably coupled to a drive member, referred to herein as a tool holder, that extends from a portion of the main body of the power tool. The electric motor is configured to rotate and/or oscillate the tool holder at relatively high frequencies.

The tool holder in turn is configured to secure different accessory tools so that as the tool holder is driven to move by the electric motor, an accessory tool secured to the holder is driven to perform work on a work piece. Accessory tools for oscillating power typically have a mounting portion and a work portion. The mounting portion is configured to interface with the tool holder in a manner that enables the accessory tool to be oscillated with the tool holder. The work portion extends from the mounting portion and is configured to perform some kind of function as the accessory tool is oscillated. For example, blade accessory tools typically have a cutting edge for performing cuts as the tool is oscillated.

The work portion of accessory tools, such as a cutting edge, will inevitably become worn with use. The work portion can also be damaged through inadvertent contact with an object such as a nail during a cutting operation. The work portion is only a small part of the overall structure of the accessory tool, but, when the work portion becomes worn or damaged, the entire accessory tool is no longer useful. What is needed is a blade configuration that does not require extra material, fabrication, and processing to incorporate a mounting interface onto the tool so that the blade could be manufactured at lower cost, and a blade attachment system that enables such blades to be used with the standard tool interface.

DETAILED DESCRIPTION

For the purposes of promoting an understanding of the principles of the invention, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one of ordinary skill in the art to which this disclosure pertains.

The disclosure is directed to a blade configuration and blade attachment system for an oscillating power tool in which the blade construction is simplified by eliminating the mounting interface. The blade attachment system is configured to releasably secure the blade to the tool holder and provide a quick change capability that is not possible with prior art blade and blade attachment systems. In addition, the blade attachment system enables different configurations of blades to be used.

Figure 1:
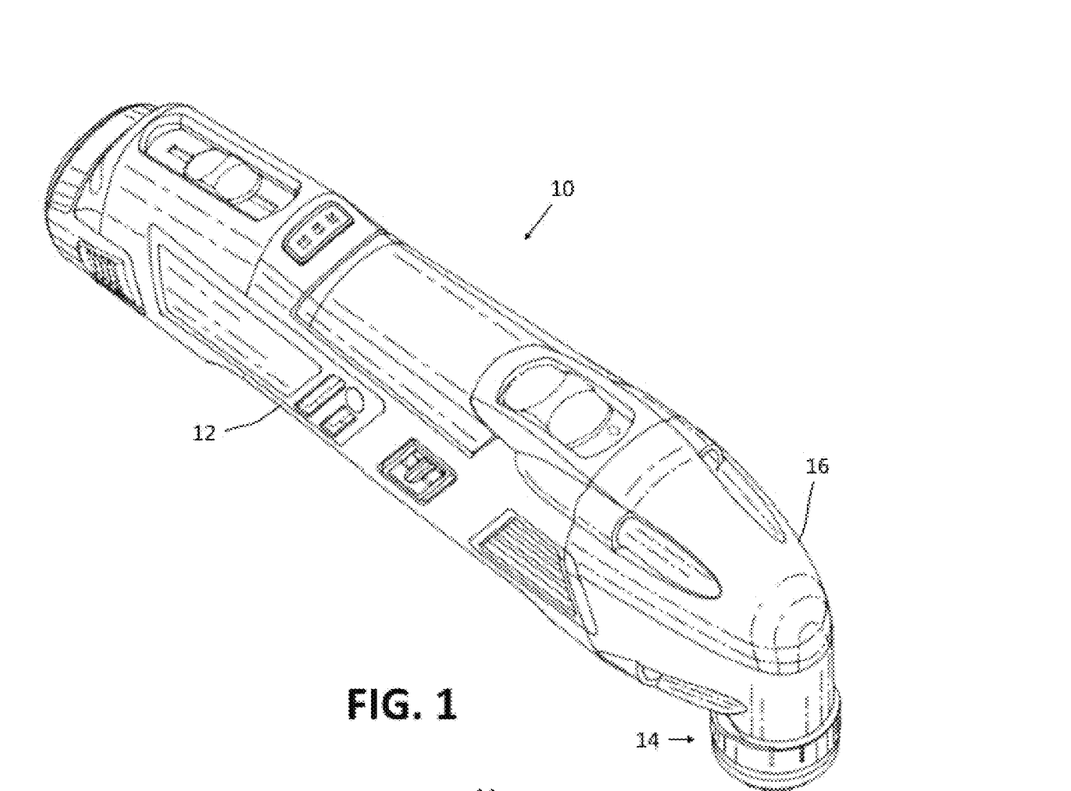
FIG. 1 is a perspective view of an oscillating tool.
Figure 2:
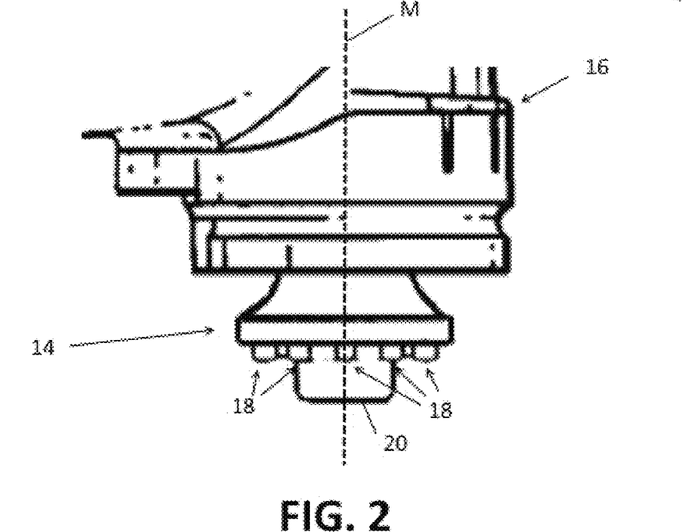
FIG. 2 is a side view of the tool holder of the oscillating tool of FIG. 1.

As depicted in FIGS. 1 and 2, an oscillating power tool 10 includes a housing 12 that serves as a hand grip for the tool 10 and an enclosure for retaining an electric motor (not shown). The electric motor oscillates a tool holder 14 extending from a nose portion 16 of the housing to which various accessory tools may be attached. As the tool holder 14 is oscillated, an accessory tool secured to the tool holder is driven to perform a particular function, such as cutting, depending on the configuration of the type of accessory tool. Power for the electric motor is received from a suitable power source (not shown), such as an internal batter supply, a power cord connected to an AC wall outlet, a USB connected to an external source such as an electronic device, AC wall outlet, or in a vehicle, a wireless charging such as an inductive charging or Qi charging.

Referring to FIG. 2, the motor is configured to oscillate the tool holder 14 about an axis M at high frequencies, e.g., 5,000 to 25,000 oscillations per minute, with a small oscillating angle, typically in a range of between 0.5° and 7°. To enable a secure connection between the tool holder 14 of the power tool 10 and accessory tools for use with the power tool, the tool holder 14 is provided with a tool drive structure. The drive structure includes topographical features, such as protrusions, openings, recesses, and the like, that are arranged in a particular pattern and have predetermined sizes and shapes. In the embodiment of FIG. 2, the tool holder 14 includes a tool drive interface that comprises a plurality of protrusions 18 arranged in a circular pattern about a central bore (not shown).

Tool holder 14 includes a fastening structure 20 that is configured to retain an accessory tool on the tool holder 14. In the embodiment of FIG. 2, the fastening structure 20 comprises a clamping screw that is configured to be threaded into the central bore of the tool holder 14. The head of the clamping screw is configured to press the accessory tool against the tool holder 14 to retain the accessory tool on the tool holder. In alternative embodiments, any suitable type of fastening structure for the tool holder 14 may be used.

Figure 3:
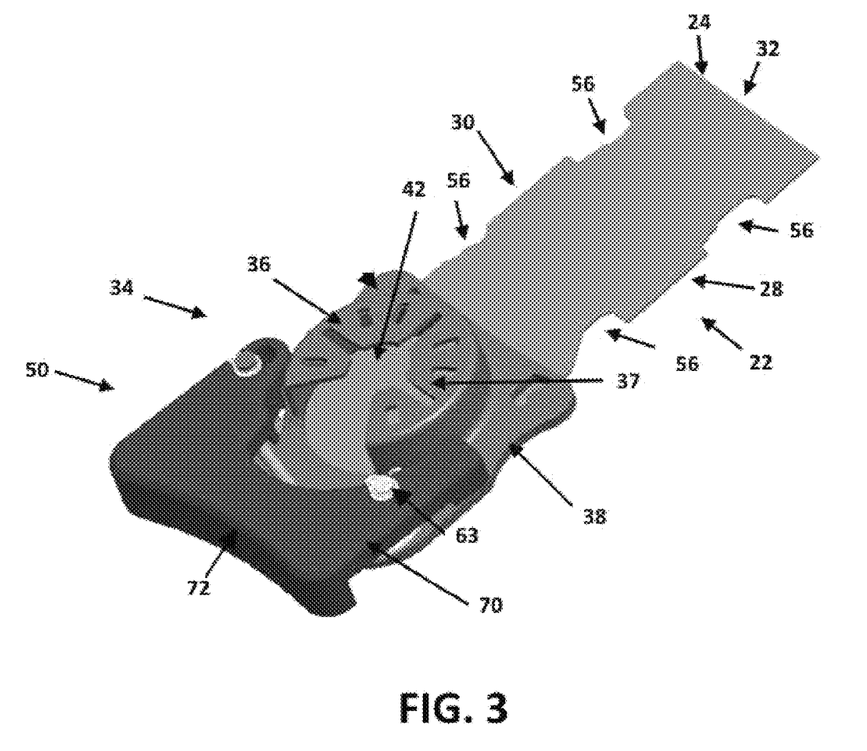
FIG. 3 is a perspective view of first embodiment of a blade attachment system attached to a tool holder of an oscillating tool, such as the tool holder of FIG. 2.
Figure 4:
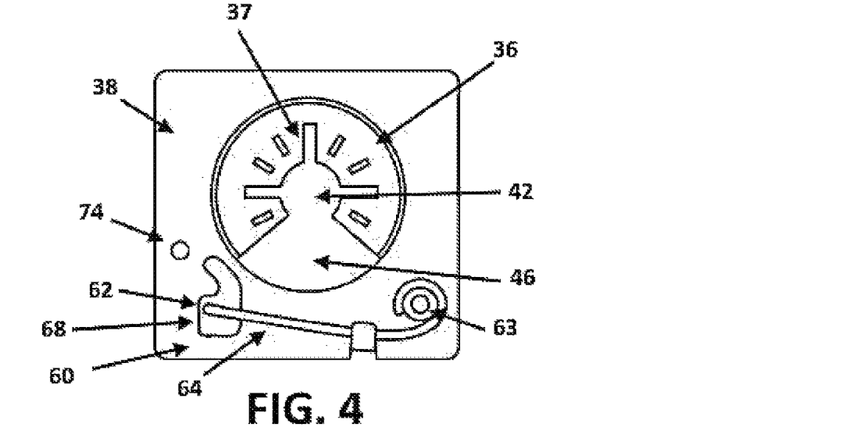
FIG. 4 is a schematic view of the blade holder plate of the blade attachment system of FIG. 3.
Figure 5:
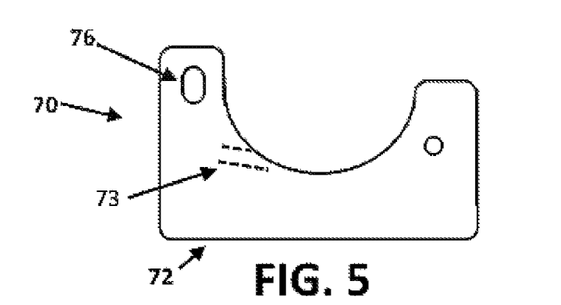
FIG. 5 is a schematic view of the lever arm of the locking mechanism of the blade attachment system of FIG. 3.
Figure 6:
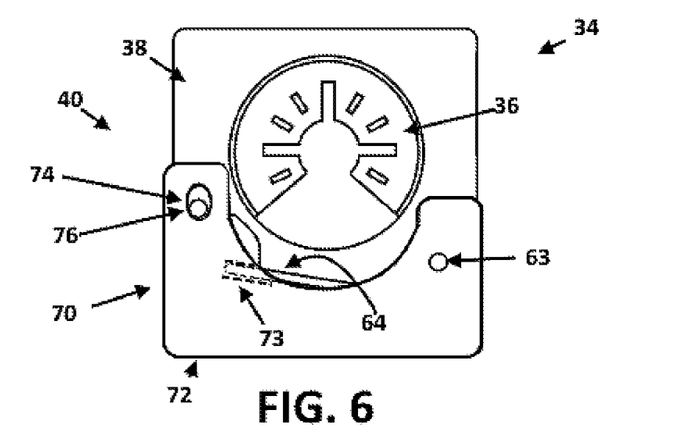
FIG. 6 is a schematic view of the lever arm of FIG. 5 mounted onto the blade holder plate of FIG. 4.
Figure 7:
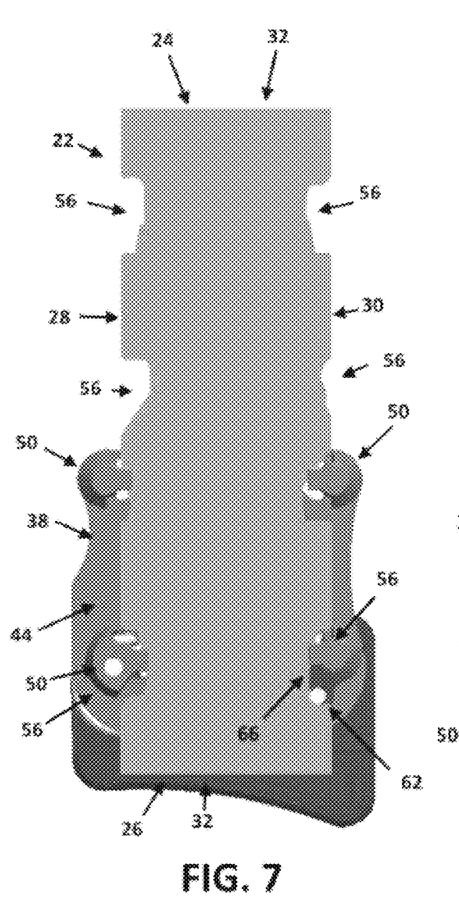
FIG. 7 is a bottom view of the blade attachment system of FIG. 3 with the locking mechanism in a locked position.
Figure 8:
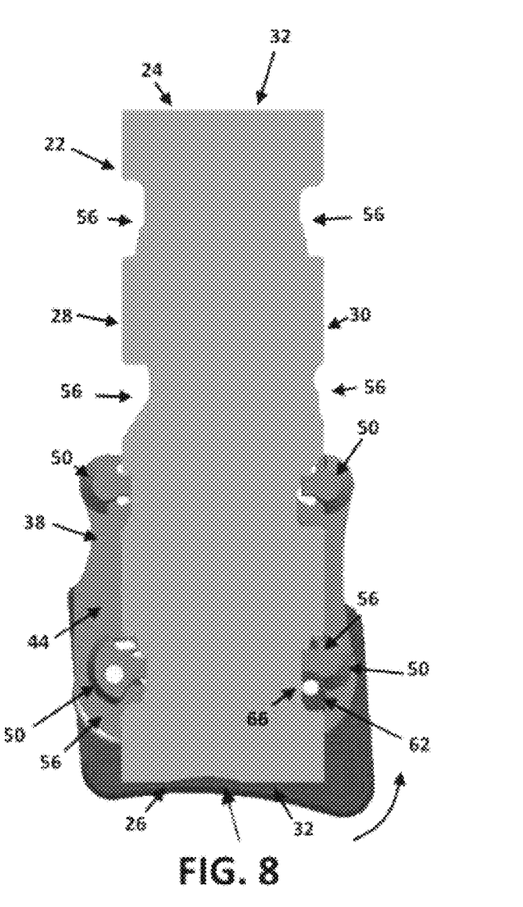
FIG. 8 is a bottom view of the blade attachment system of FIG. 3 with the locking mechanism in an unlocked position.

Accessory tools, such as blades, for use with the tool holder typically have a tool attachment interface that is configured to interlock with the tool drive interface of the tool holder. The blade attachment system enables blades that do not have the tool drive interface to be secured to the tool holder. An example of a blade that can be secured to the tool holder by the blade attachment system is depicted in FIGS. 3, 7, and 8. The blade 22 comprises a planar, rectangular-shaped body formed of a hard metal material, such as carbon steel. Other materials suitable for making a blade in order to cut a target such as wood, plastic, concrete, or the like are possible. The blade has a first end portion 24, a second end portion 26, and a pair of lateral edge portions 28, 30. At least one of the end portions comprises a cutting edge. The blade 22 is not provided with an oscillating interface for mounting the blade to the oscillating tool as is typically used in previously known blade accessory tools. Therefore, the extra material, fabrication, and assembly required to manufacture blades with integral mounting features is not needed so the cost of manufacturing the blade can be significantly reduced.

Another benefit of not requiring an oscillating interface is that the second end of the blade can now be used as an additional cutting edge. For example, as depicted in FIGS. 7 and 8, the first and the second end portions 24, 26 of the blade can each include a cutting edge 32. The cutting edges 32 may comprise serrated cutting edges having a plurality of cutting teeth. The cutting teeth may be formed in any suitable manner including grinding or laser cutting. The geometry of the cutting teeth can be varied from blade to blade to facilitate the cutting of different kinds of materials, such as wood and metal. The cutting edges 32 on each end of the blade may have the same configuration or different configurations to facilitate use with different kinds of material.

The blade 22 may be formed from a single piece of sheet metal. Alternatively, the blade may be formed by two separate pieces of sheet metal that are fixed together, e.g., by spot welding, ultrasonic welding, or the like. This may simplify that manufacturing process as blades with different cutting edges can be manufactured separately and then assembled with different combinations of cutting edge types. This also allows different materials to be used for different blade portions and cutting edge types to further facilitate use in different applications.

FIGS. 3-8 depict an embodiment of a blade attachment system 34 for attaching a blade to the tool holder. The blade attachment system 34 includes a tool mount adapter 36, a blade holder plate 38, a blade clamping assembly 40, and a locking mechanism 60. The tool mount adapter 36 is configured to releasably secure the blade attachment system 34 to the tool holder 14 of the oscillating tool in a manner that enables the blade attachment system 34 to be oscillated by the tool holder 14. The blade holder plate 38 provides a support structure for attaching the blade. The locking mechanism is configured to lock the blade in a clamped position with respect to the blade holder plate. The blade clamping assembly is configured to apply a clamping force both vertically and laterally to the blade when the blade is in the clamped position.

The tool mount adapter 36 is formed of a metal material, such as carbon steel, having a generally flat shape and may include mounting features and drive interfaces are typically integrated into the accessory tools of the prior art. The drive attachment interface 37 is configured complementarily with respect to the drive structure and fastening mechanisms on the tool holder 14 of the oscillating power tool 10. In addition, the tool mount adapter 36 defines a central opening 42 through which the clamping screw passes prior to being engaged with a bore of the tool holder 16. To install the blade attachment system onto the tool holder, the tool mount adapter 36 is held against the tool holder 14 with the drive interfaces interlocked. The clamping screw 20 is then tightened until the head of the clamping screw 20 presses the tool mount adapter 36 against the tool holder 14 as depicted in FIG. 3.

The blade holder plate 38 is secured to the tool mount adapter 36 and provides a support structure for blade clamping assembly 40 and the blade 22. The blade holder plate 38 is formed of metal or some other type of suitably rigid and strong material including certain plastic and composite materials. The blade holder plate 38 and the tool mount adapter 36 may be integrally formed as depicted in FIGS. 3-8. Alternatively, the blade holder plate 38 and the tool mount adapter 36 may be provided as separate components that are secured together, e.g., by welding.

The blade holder plate 38 includes a lower surface 44 (FIGS. 7 and 8) that faces away from the tool holder 14 and that provides a location for attaching blade 22. The blade holder plate 38 is positioned with respect to the tool mount adapter 36 such that, when the tool mount adapter 36 is installed on the tool holder 16, the blade holder plate 38 is offset below the tool mount adapter 36. An opening 46 is defined in the central region of the blade holder plate 38 for accessing the tool mount adapter 36.

The blade clamping assembly 40 is mounted to the blade holder plate 38 and is configured to apply a clamping force both vertically and laterally to the blade. The vertical clamping force holds the blade 22 against the lower surface 44 of the blade holder plate 38, or in some cases, the lower surfaces of spacer structures and works to prevent movement of the blade 22 in directions orthogonal to the lower surface 44 of the blade holder plate 38. The lateral clamping force is applied laterally to the blade and works to prevent movement of the blade in directions that are generally parallel to the lower surface of the blade holder plate and the plane of the blade. The mechanisms used to generate the vertical and lateral clamping forces can vary depending on the configuration of the clamping assembly.

In the embodiment of FIGS. 3-8, the clamping force is generated by clamping pins 50. The clamping pins 50 extend downwardly from the lower surface 44 of the blade holder plate 38 at positions where the pins 50 can engage the lateral edges 28, 30 of the blade. At least one pin 50 is positioned to engage each lateral side of the blade. In the embodiment of FIGS. 3-8, two clamping pins 50 are used to engage each lateral edge of the the blade 22.

Each of the pins 50 comprises a wider head portion and a narrow base portion. The base portions of the pins are positioned just outside of the locations where the edges of the blade are desired to be placed when secured to the blade holder plate. The head portions of the pins are wide enough to overlap the edge of a blade of the appropriate size when the blade is placed between the pins. The pins 50 are tapered inwardly from the head portion to the base portion so that lateral movement of the blade edge toward the tapered surface of the pin results in a vertical movement of the blade toward the lower surface of the plate. In this manner, the pins 50 may be used to create both a lateral and a vertical clamping load for securing the blade to the blade holder plate. The head portion may be tapered around the entire circumference of the pin. Alternatively, the tapered portion may be provided only on the portion of the pin arranged facing the edge of the blade.

The blade 22 may be provided with cutouts 56 in positions to be engaged by the clamping pins. The inner edges of the cutouts 56 form cam profiles which can be engaged by the clamping pins to generate the vertical and lateral clamping loads. The clamping pins 50 and the cutouts 56 cooperate to define a clamping position for the blade. The clamping position is defined as the position of the blade that results in a suitable amount of force being generated via the engagement between the clamping pins and the cutouts to reasonably and safely secure the blade to the blade holder plate for the performance of standard cutting operations with the blade.

In the embodiment of FIGS. 3-8, the cam profiles are defined on the front portions of the cutouts 56. The clamping pins are positioned rearwardly with respect to the cam profiles. Therefore, the blade is moved into a clamping position by moving the blade rearwardly to bring the cam profiles of the cutouts into engagement with the clamping pins. The rearward movement of the blade to the clamped position can be implemented in any suitable manner. For example, the blade can simply be moved rearwardly manually by a user until the clamped position is reached. Alternatively, the blade clamping assembly may be configured with mechanisms capable of generating movement of the clamping pins with respect to the blade in some manner.

The locking mechanism 60 of the blade attachment system is configured to retain the blade in the clamped position on the blade holder plate. The locking mechanism can be provided as an independent mechanism from the clamping assembly. Alternatively, the locking functionality can be integrated at least in part by the clamping assembly. In the embodiment of FIGS. 3-8, the locking mechanism includes a locking tab 62 and a biasing element 64. The locking tab 62 comprises a projection, protuberance, detent, or similar type of structure. The locking tab 62 is configured to engage a complementary feature provided on the blade. In the embodiment of FIGS. 3-8, the blade 22 is provided with cutout 66 that is configured to be engaged by the locking tab 62. The locking tab 62 is configured to be moved to a locked position at which the locking tab 62 engages the tab cutout 66 in the blade. The biasing element 64 is configured to bias the locking tab 62 into the locked position and to generate a predetermined amount of locking force for retaining the locking tab 62 in the locked position and thereby retain the blade in the clamped position.

In the embodiment of FIGS. 3-8, the locking mechanism 60 is embodied as a wire form that is mounted onto a pin 63 on the blade holder plate 38. The wire form extends generally laterally across the blade holder plate 38 toward a guide slot 68. The end portion of the wire form is bent to form the locking tab 62. The locking tab 62 extends through the guide slot 68 and is received in the tab cutout 66 in the blade 22. In the embodiment of FIGS. 3-8, one or more of the cutouts 56 on the lateral edges of the blade is configured to serve as the cutout for the locking tab.

The guide slot 68 is configured to guide the movement of the locking tab 62 between the locked position (FIG. 7) and the unlocked position (FIG. 8). The wire form is mounted in tension, e.g., by winding the wire form around pins and through slots, so that the locking tab 62 on the wire form is biased toward the locked position in the guide slot 68. The guide slot 68 is shaped to provide a location corresponding to the locked position at which the locking tab can be retained using only the tension of the wire form.

The locking mechanism 60 includes a lever arm 70 that is configured to move the locking tab into and/or out of engagement with the tab cutout in the blade. In the embodiment of FIGS. 3-8, the lever arm 70 is coupled to the wire form and is pivotably mounted to the pin 63 on the blade holder plate 38. In one embodiment, the lever arm 70 includes a recess 73 defined in the underside of the lever arm 70 into which the wire form is received so that movement of the lever arm 70 may be imparted to the wire form. The lever arm 70 is configured to be pivoted with respect to the blade holder plate between the locked (FIG. 7) and unlocked (FIG. 8) positions. The lever arm 70 provides surfaces that can receive an applied force in order to move the wire form and the locking tab from the locked position to an unlocked position. For example, the lever arm in FIGS. 3-8 includes a rearward portion 72 that extends beyond the rearmost edge of the blade and the blade holder plate that can be pressed by a user of the tool to unlock the blade from the blade holder plate. In this embodiment, the lever arm 70 is also configured to serve as a guard the shields a user from the rear portion of the blade.

The lever arm 70 and the blade holder plate 38 may include guide features for guiding the movement of the lever arm 70 between the locked and unlocked positions. In the embodiment of FIGS. 3-8, the blade holder plate is provided with a guide pin 74 and the lever arm 70 is provided with a slot 76 in which the guide pin is received. The interaction between the guide pin 74 and the slot 76 guides and constrains the movement of the lever arm 70 between the locked and unlocked positions.

Figure 9:
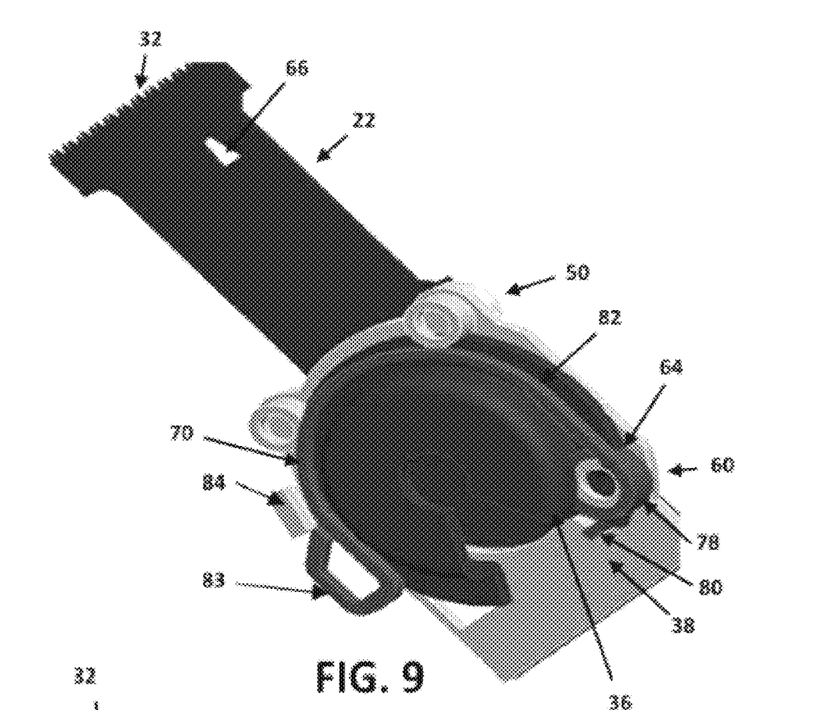
FIG. 9 is a top perspective view of another embodiment of a blade attachment system for an oscillating tool.
Figure 10:
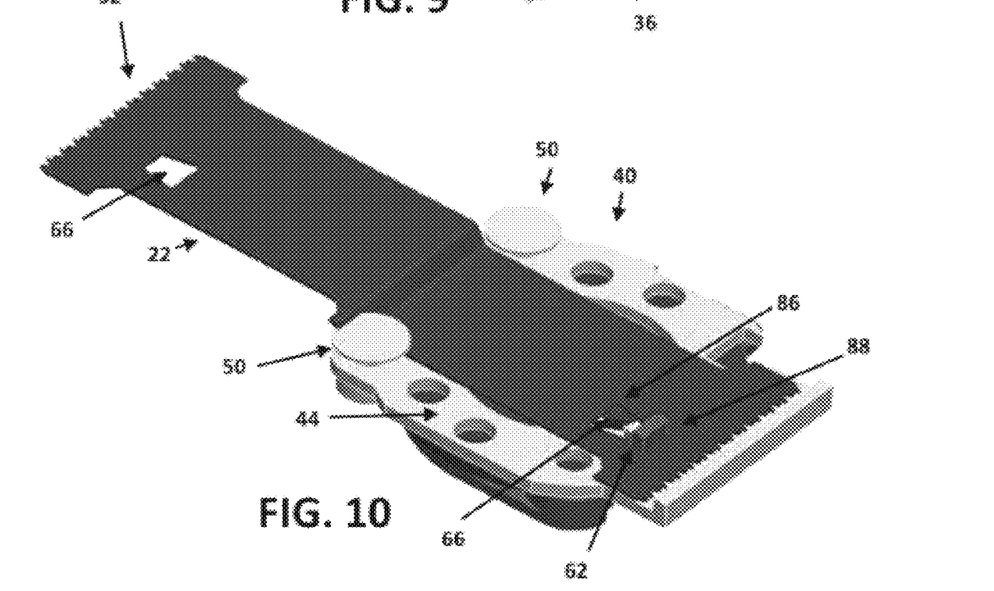
FIG. 10 is a bottom perspective view of the blade attachment system of FIG. 9.

Another embodiment of a blade attachment system is depicted in FIGS. 9 and 10. The blade attachment system of FIGS. 9 and 10 includes a tool mount adapter 36, a blade holder plate 38, a clamping assembly 40, and a locking mechanism 60. The clamping assembly 40 includes clamping pins 50 extending from a lower surface 44 of the blade holder plate at positions to engage each lateral edge of the blade.

The locking mechanism 60 includes a locking tab 62 and a biasing element 64. Similar to the embodiment of FIGS. 3-8, the locking tab 62 and biasing element 64 are embodied as a wire form. The wire form in this embodiment comprises a helical torsion spring having a coil spring portion 78 with a first end portion 80 and a second end portion 82 extending from the coil spring portion. The coil spring portion 80 is retained on a pin provided on the blade holder plate. The locking tab 62 is provided on the end of the first end portion 80 of the torsion spring. As can be seen in FIG. 10, the locking tab 62 is received in a tab cutout 66 defined in the blade.

The second end portion 82 of the helical torsion spring is configured to serve as the lever arm 70 for the locking mechanism. In this embodiment, the lever arm 70 is configured to generate the locking force for retaining the locking tab 62 in the locked position and to release the locking force from the locking tab 62 so the blade can be removed. The locking force for holding the locking tab in the locked position is generated by wrapping the second end portion 82 around the tool mount adapter 36 to place the torsion spring in tension. The blade holder plate 38 may include a spring stop tab 84 that is positioned to retain the second end portion 82 in the locked position as depicted in FIG. 9. The second end portion 82 of the spring may be shaped to facilitate engagement with the spring stop tab 84 and also to facilitate manual movement of the second end portion by a user of the tool. As can be seen in FIG. 9, the second end portion 82 of the torsion spring is bent to form a grip tab 83 to make it easier to be grasped and manipulated by a user.

The locking tab 62 may also be configured to serve as part of the clamping assembly. As can be seen in FIG. 10, the locking tab 62 has a head portion that is extended through the tab cutout 66 in the blade 22. The head portion is wider than a base portion of the tab that is located in the cutout a clamping structure. The tab cutout 66 is shaped to define an insertion region 86 and a clamping region 88. The insertion region 86 is wider than the head portion of the locking tab 62 to allow the locking tab to be inserted through the tab. The tab cutout 66 narrows as it approaches the clamping region 88 of the cutout to a point where the cutout 66 is narrower than the head portion but wider than the base portion of the locking tab 62. As the tab 62 moves rearwardly in the slot 66 to a locked position, the head portion of the locking tab 62 overlaps portions of the blade on the sides of the cutout. The interaction between the locking tab 62 and the tab cutout 66 can therefore be used to hold the blade against the support surface of the blade holder plate and to prevent lateral movement of the blade with respect to the blade holder plate. The undercut surfaces of the head portion of the tab may be tapered inwardly so that as the tab cutout narrows, a vertical and a lateral clamping force can be generated.

Figure 11:
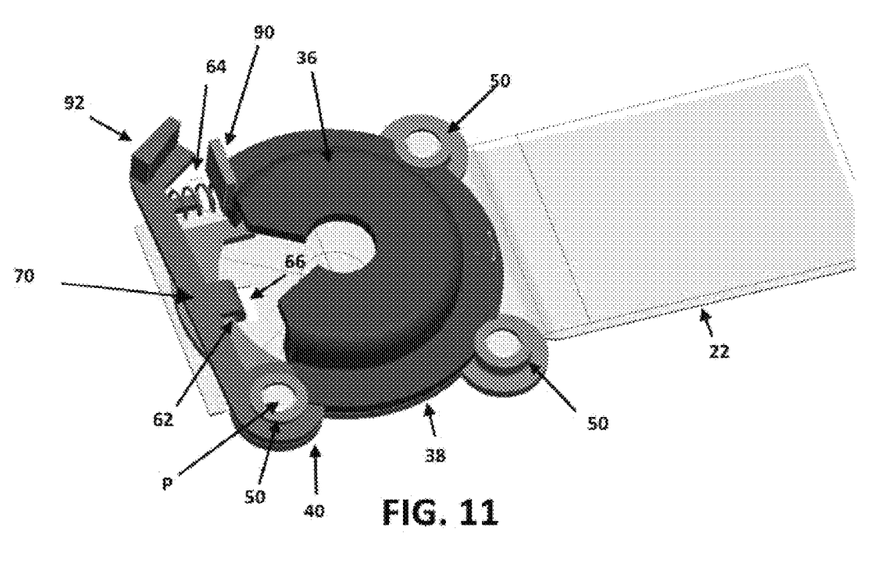
FIG. 11 is a top perspective view of another embodiment of a blade attachment system for an oscillating tool.

FIG. 11 depicts another embodiment of a blade attachment system. The blade attachment system of FIG. 11 includes a tool mount adapter 36, a blade holder plate 38, a clamping assembly 40, and a locking mechanism 60. The clamping assembly includes clamping pins 50 configured to clamp the blade to the blade holder plate 38. The locking mechanism 60 comprises a lever arm 70, locking tab 62, and a biasing element 64. In this embodiment, the locking tab 62 is provided on the lever arm 70. The lever arm 70 is pivotably mounted on the blade holder plate 38 and is extended across a rear portion of the plate 38. The locking tab 62 extends downwardly from an intermediate portion of the lever arm 70 into engagement with a tab cutout 66 formed in the blade 22.

The lever arm 70 is biased rearwardly about the pivot point P by the biasing element 64 which in this embodiment comprises a coil spring. The coil spring 64 is positioned between the lever arm 70 and a wall structure 90 on the blade holder plate 38. The lever arm 70 is provided with an actuation portion 92 to facilitate manual movement of the lever arm by a user of the tool. For example, the lever arm 70 can be moved to an unlocked position by pressing forwardly on the actuation portion 92 with sufficient force to overcome the spring force. In the unlocked position, the locking tab 62 is moved forwardly with respect to the tab cutout 66 which releases the clamping force applied to the blade by the clamping pins 50 and allows removal of the blade from the blade holder plate.

Figure 12:
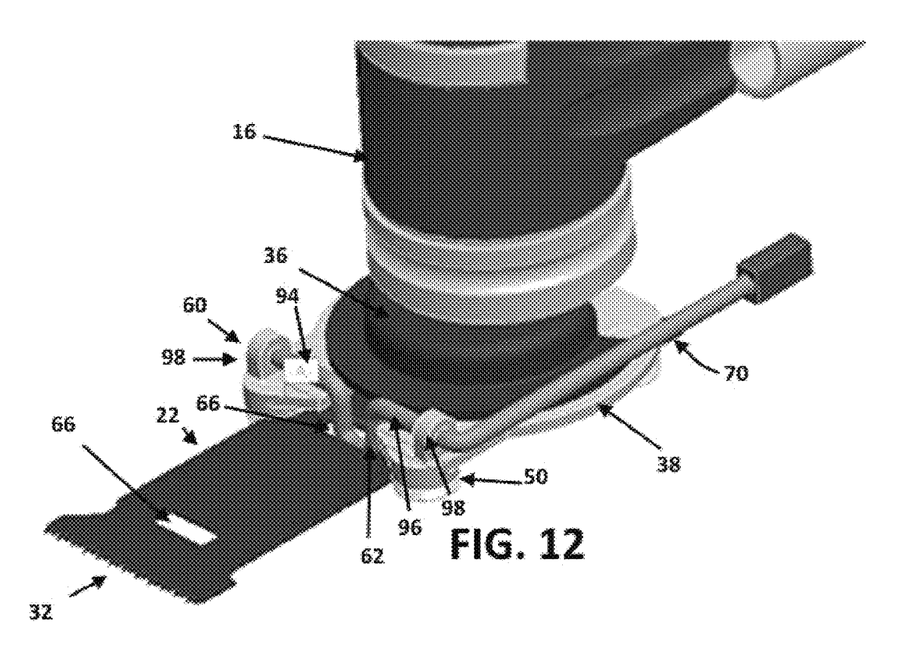
FIG. 12 is a top perspective view of another embodiment of a blade attachment system for an oscillating tool with the locking mechanism in a locked position.
Figure 13:
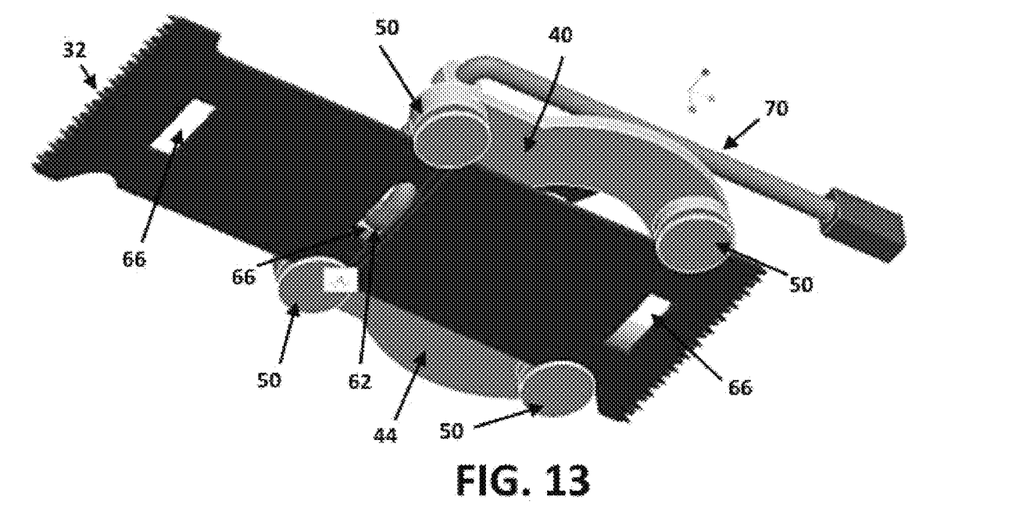
FIG. 13 is a bottom perspective view of the blade attachment system of FIG. 12 with the locking mechanism in a locked position.
Figure 14:
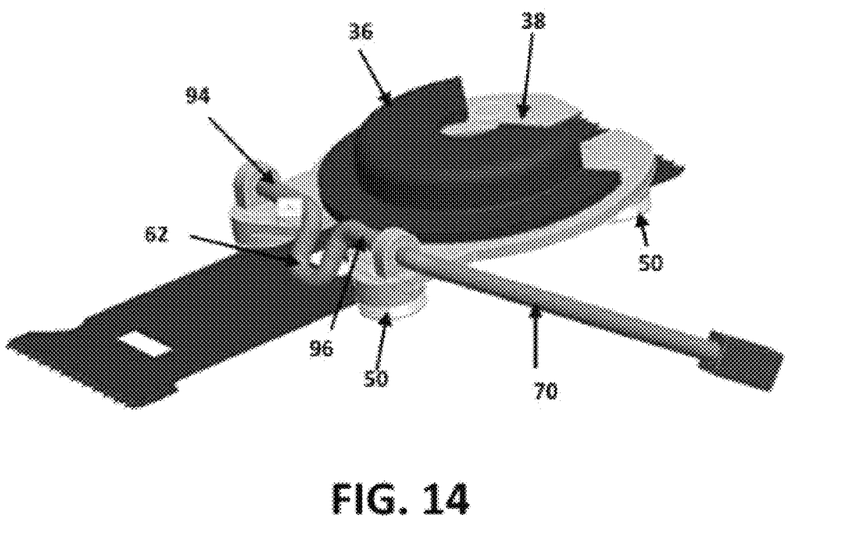
FIG. 14 is a top perspective view of the blade attachment system of FIG. 12 with the locking mechanism in an unlocked position.

FIGS. 12-14 depict another embodiment of a blade attachment system for an oscillating tool. The blade attachment system of FIGS. 12-14 includes a tool mount adapter 36, a blade holder plate 38, a clamping assembly 40, and a locking mechanism 60. The clamping assembly 40 includes a plurality of clamping screws 50 that extend from the lower surface 44 of the blade holder plate 38 in positions to engage the lateral edges of the blade. The locking mechanism 60 comprises a wire form element that is shaped to form a locking tab 62 and a lever arm 70. As can be seen in FIG. 12, the locking tab 62 is formed by a bent portion of the wire. The wire segments 94, 96 on each side of the locking tab 62 are rotatably supported by collar structures on the blade holder plate 38. The wire segments 94, 96 are aligned to form an axle structure that is configured to rotate about a rotation axis.

The remaining portion of the wire is bent to form the lever arm 70. The lever arm 70 can be manually pivoted with respect to the blade holder plate 38 by a user of the tool. The lever arm 70 is configured to be pivoted between a clamped or locked position (FIGS. 12 and 13) and an unclamped or unlocked position (FIG. 14) with respect to the blade holder plate 38. The locking tab 62 is oriented so that when the lever arm 70 is moved to the clamped position, the locking tab is moved into engagement with a cutout 66 formed in the blade. The wire form may be configured in a manner such that the lever arm 70 and/or the locking tab 62 are biased toward and/or into the locked position. The blade may be released from the clamped position by pivoting the lever arm 70 downwardly in order to move the locking tab 62 out of engagement with the cutout 66 in the blade 22 as depicted in FIG. 14.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A handheld oscillating power tool comprising:
   a portable housing;
   a tool holder extending from the housing and configured to be oscillated about an oscillation axis, the tool holder including a tool drive interface;
   a blade having a planar body with a leading edge, a trailing edge, and a pair of lateral edges, at least one of the leading edge and the trailing edge comprising a cutting edge, the blade defining at least one locking tab cutout; and
   blade attachment system including:
      a tool mount adapter having a drive attachment interface, the drive attachment interface being configured to be releasably secured to the tool drive interface of the tool holder such that the blade attachment system oscillates with the tool holder;
      a blade holder plate attached to the tool mount adapter;
      a clamping assembly attached to the blade holder plate and configured to apply a clamping force to the blade when the blade is at a clamping position in relation to the blade holder plate; and
      a locking mechanism configured to lock the blade in the clamping position on the blade holder plate, the locking mechanism including a wire form having a first end portion, a second end portion, and a body portion extending between the first end portion and the second end portion,
   wherein the first end portion of the wire form is mounted to the blade holder plate, wherein the second end portion of the wire form forms a locking tab,
   wherein the body portion of the wire form movably supports the second end portion of the wire form such that the locking tab is movable between a locked position and an unlocked position with respect to the blade holder plate, the body portion being configured as a biasing element that biases the second end portion toward the locked position, wherein, when the blade is in a clamping position on the blade holder plate and the second end portion of the wire form is in the locked position, the locking tab is positioned in engagement with the locking tab cutout in the blade, and wherein, when the blade is in the clamping position on the blade holder plate and the second end portion of the wire form is in the unlocked position, the locking tab is spaced apart from the locking tab cutout in the blade.

2. The handheld oscillating power tool of claim 1, wherein the blade holder plate defines a guide slot, wherein the locking tab extends through the guide slot, wherein the guide slot defines the locked and unlocked positions for the locking tab and guides movement of the locking tab between the locked and unlocked positions.

3. The handheld oscillating power tool of claim 2, wherein the locking mechanism further comprises a lever arm that is pivotably mounted to the blade holder plate and is connected to the wire form, wherein the lever arm is pivotable between a locked and unlocked position by a user of the tool, and wherein movement of the lever arm from the locked to the unlocked positions moves the locking tab from the locked to the unlocked position with respect to the guide slot and with respect to the locking tab cutout.

4. The handheld oscillating power tool of claim 3, wherein the lever arm includes a rear portion that covers a trailing portion of the blade and a trailing portion of the blade holder plate.

5. The handheld oscillating power tool of claim 4, wherein the blade holder plate includes a guide pin and the lever arm includes a slot in which the guide pin is received, and wherein the slot and the guide pin interact to guide movement of the lever arm between the locked and unlocked positions.

6. The handheld oscillating power tool of claim 1, wherein the blade includes clamping pin cutouts in the lateral edges of the blade, wherein the clamping assembly includes clamping screws configured to apply the clamping force, and wherein the clamping screws are positioned to engage the clamping pin cutouts when the blade is in the clamping position.

7. The handheld oscillating tool of claim 1, wherein the blade holder plate includes a spring stop tab configured to retain the second end portion in a tensioned position at which the locking tab is biased toward the locked position.

8. The handheld oscillating tool of claim 7, wherein the second end portion includes a grip tab portion to facilitate manual movement of the second end portion to and from the tensioned position.

9. The handheld oscillating tool of claim 1, wherein the locking mechanism includes a lever arm that is pivotably mounted to the blade holder plate for movement between the locked and unlocked positions, wherein the locking tab is mounted to the lever arm and extends from the lever arm into the locking tab cutout, and wherein the biasing element comprises a spring that is positioned to bias the lever arm toward the locked position.

10. The handheld oscillating tool of claim 1, wherein the locking mechanism comprises a wire form that is pivotably mounted to the blade holder plate, the wire form having a bent portion configured to serve as the locking tab and a lever arm portion configured to be pivoted with respect to the blade holder plate to move the locking tab between the locked and unlocked positions.

11. A blade attachment system comprising:

a tool mount adapter having a drive attachment interface, the drive attachment interface being configured to be releasably secured to a tool drive interface of a toolholder of an oscillating tool such that the blade attachment system oscillates with the tool holder;

a blade holder plate attached to the tool mount adapter;

a clamping assembly attached to the blade holder plate and configured to apply a clamping force to a blade when the blade is in a clamping position on the blade holder plate; and a locking mechanism configured to lock the blade in the clamping position on the blade holder plate, the locking mechanism including a wire form having a first end portion, a second end portion, and a body portion extending between the first end portion and the second end portion, wherein the first end portion of the wire form is mounted to the blade holder plate, wherein the second end portion of the wire form includes a locking tab, wherein the body portion of the wire form movably supports the second end portion of the wire form such that the locking tab is movable between a locked position and an unlocked position with respect to the blade holder plate, the body portion being configured as a biasing element that biases the second end portion toward the locked position, wherein, when the blade is in the clamping position on the blade holder plate and the second end portion of the wire form is in the locked position, the locking tab is positioned in engagement with the locking tab cutout in the blade, and wherein, when the blade is in the clamping position on the blade holder plate and the second end portion of the wire form is in the unlocked position, the locking tab is spaced apart from the locking tab cutout in the blade.

12. The blade attachment system of claim 11, wherein the blade holder plate defines a guide slot, wherein the locking tab extends from the second end portion of the wire form through the guide slot, wherein the guide slot defines the locked and unlocked positions for the locking tab.

13. The blade attachment system of claim 12, wherein the locking mechanism further comprises a lever arm that is pivotably mounted to the blade holder plate and is connected to the wire form, wherein the lever arm is pivotable between a locked and unlocked position by a user of the tool, and wherein movement of the lever arm from the locked to the unlocked positions moves the locking tab from the locked to the unlocked position with respect to the guide slot and the locking tab cutout.

14. The blade attachment system of claim 11, wherein the locking mechanism comprises a helical torsion spring having a coil spring portion, a first end portion, and a second end portion, the coil spring portion being mounted onto a pin on the blade holder plate, the first end portion including the locking tab, the second end portion being configured as the biasing element.

15. The blade attachment system of claim 14, wherein the blade holder plate includes a spring stop tab configured to retain the second end portion in a tensioned position at which the locking tab is biased toward the locked position.

16. The blade attachment system of claim 15, wherein the second end portion includes a grip tab portion to facilitate manual movement of the second end portion to and from the tensioned position.

17. The blade attachment system of claim 11, wherein the locking mechanism includes a lever arm that is pivotably mounted to the blade holder plate for movement between the locked and unlocked positions,
   wherein the locking tab is mounted to the lever arm and extends from the lever arm into the locking tab cutout, and
   wherein the biasing element comprises a spring that is positioned to bias the lever arm toward the locked position.

* * * * *